United States Patent
Hiraoka (10) Patent No.: US 9,210,923 B2
(45) Date of Patent: Dec. 15, 2015

(54) SPINNING REEL (71) Applicant: Shimano Inc., Sakai, Osaka (JP)

(72) Inventor: Hirokazu Hiraoka, Osaka (JP)

(73) Assignee: Shimano Inc., Osaka (JP)

( * ) Notice: Subject to any disclaimer, the term of this patent is extended or adjusted under 35 U.S.C. 154(b) by 46 days.

(21) Appl. No.: 14/097,770

(22) Filed: Dec. 5, 2013

(65) Prior Publication Data

US 2014/0191071 A1    Jul. 10, 2014

(30) Foreign Application Priority Data

Jan. 7, 2013  (JP) .................................. 2013-000341

(51) Int. Cl.
*A01K 89/01*     (2006.01)
*A01K 89/015*    (2006.01)

(52) U.S. Cl.
CPC .............. *A01K 89/015* (2013.01); *A01K 89/01* (2013.01)

(58) Field of Classification Search
CPC .................................................. A01K 89/00
USPC ........................................ 242/310, 311, 312
See application file for complete search history.

(56) References Cited

U.S. PATENT DOCUMENTS

| | | | | |
|---|---|---|---|---|
| D460,516 S * | 7/2002 | Yoshikawa et al. | .......... | D22/141 |
| 6,629,655 B2 * | 10/2003 | Kitajima | ....................... | 242/311 |
| 6,857,588 B1 * | 2/2005 | Chang | ........................... | 242/311 |
| 7,118,059 B2 * | 10/2006 | Morise | .......................... | 242/311 |
| 7,413,138 B2 * | 8/2008 | Kitajima et al. | .............. | 242/311 |
| 7,628,348 B2 * | 12/2009 | Saito | ............................. | 242/311 |
| 7,802,744 B2 * | 9/2010 | Saito | ............................. | 242/241 |
| 2003/0146325 A1 * | 8/2003 | Kitajima | ....................... | 242/311 |
| 2004/0200917 A1 * | 10/2004 | Nishikawa | .................... | 242/311 |
| 2005/0051652 A1 | 3/2005 | Myojo et al. | | |
| 2009/0072065 A1 | 3/2009 | Saito | | |

FOREIGN PATENT DOCUMENTS

JP    2008-154482 A    7/2008
JP    2010-273625 A    12/2010

OTHER PUBLICATIONS

European Search Report of corresponding EP Application No. 13 19 7409.9 dated Apr. 10, 2014.

* cited by examiner

*Primary Examiner* — Emmanuel M Marcelo
(74) *Attorney, Agent, or Firm* — Global IP Counselors (57) ABSTRACT

A spinning reel configured to forwardly reel out a fishing line includes a handle, a spool, a rotor, an oscillating mechanism, a rotor drive mechanism, and a reel unit. The reel unit includes a fishing rod attachment leg, a chassis, a lid member, a reel unit guard, a protruding portion, and a restriction portion. The chassis has a mechanism attachment space to accommodate the oscillating mechanism and the rotor drive mechanism. The protruding portion protrudes towards at least one of the chassis and the lid member from an inner lateral surface of the reel unit guard. The restriction portion is disposed on at least one of the chassis and the lid member. The restriction portion is engaged with the protruding portion to restrict the reel unit guard from moving in a direction away from the fishing rod attachment leg.

8 Claims, 9 Drawing Sheets

SPINNING REEL

CROSS-REFERENCE TO RELATED APPLICATIONS

This application claims priority to Japanese Patent Application No. 2013-000341 filed on Jan. 7, 2013. The entirety disclosure of Japanese Patent Application No. 2013-000341 is hereby incorporated herein by reference.

BACKGROUND OF THE INVENTION

1. Field of the Invention

The present invention relates to a spinning reel, and particularly to a reel unit of the spinning reel.

2. Background Art

A reel unit of a spinning reel includes a chassis, a lid member and a reel unit guard (see Publication of Japan Patent No. 4804331). The chassis has an opening bored in the lateral part thereof. The lid member is detachably attached to the chassis so as to cover the opening. The reel unit guard covers the rear part of the chassis and that of the lid member. In such reel unit of a welt-known spinning reel, the reel unit guard is positioned such that the end surface thereof makes contact in a forward-backward direction (a direction in which a spool axis extends) with the chassis and the lid member. Further, the upper part of the reel unit guard is fixed to the chassis by a screw. On the other hand, the lower part of the reel unit guard is engaged with the chassis.

SUMMARY

In the well-known spinning reel, the reel unit guard is thus positioned in contact in the forward-backward direction with the chassis and the lid member. Therefore, chances are that the reel unit guard is displaced from at least one of the chassis and the lid member, away from a reel leg in an upward-downward direction. When the reel unit guard is actually displaced in the upward-downward direction from at least one of the chassis and the lid member, chances are that a step is produced between the reel unit guard and at least either of the chassis and the lid member and the reel unit guard is wobbled.

It is an advantage of the present invention to suppress a reel unit guard from being displaced in a upward-downward direction from at least one of a chassis and a lid member in a reel unit of a spinning reel.

A spinning reel allows a fishing rod to be attached thereto. The spinning reel is configured to forwardly reel out a fishing line. The spinning reel includes a handle, a spool, a rotor, a oscillating mechanism, a rotor drive mechanism, and a reel unit. The rotor is configured to wind the fishing line about the spool. The oscillating mechanism is configured to move the spool back and forth by rotation of the handle. The rotor drive mechanism is configured to rotate the rotor by the rotation of the handle. The reel unit includes a fishing rod attachment leg, a chassis, a lid member, a reel unit, a protruding portion, and a restriction portion. The fishing rod attachment leg allows the fishing rod to be attached thereto. The chassis has a mechanism attachment space to accommodate the oscillating mechanism and the rotor drive mechanism. The lid member covers the mechanism attachment space. The reel unit guard has a tapered shape. The reel unit guard covers a rear side of the chassis and a rear side of the lid member. The protruding portion protrudes towards at least one of the chassis and the lid member from an inner lateral surface of the reel unit guard. The inner lateral surface is disposed on a side away from the fishing rod attachment leg. The restriction portion is disposed on at least one of the chassis and the lid member. The restriction portion is engaged with the protruding portion to restrict the reel unit guard from moving in a direction away from the fishing rod attachment leg. The reel unit is provided with the fishing rod attachment leg disposed on either the chassis or the lid member.

BRIEF DESCRIPTION OF THE DRAWINGS

Referring now to the attached drawings which form a part of this original disclosure.

DETAILED DESCRIPTION OF THE PREFERRED EMBODIMENTS

First Exemplary Embodiment

Entire Structure

Figure 1:
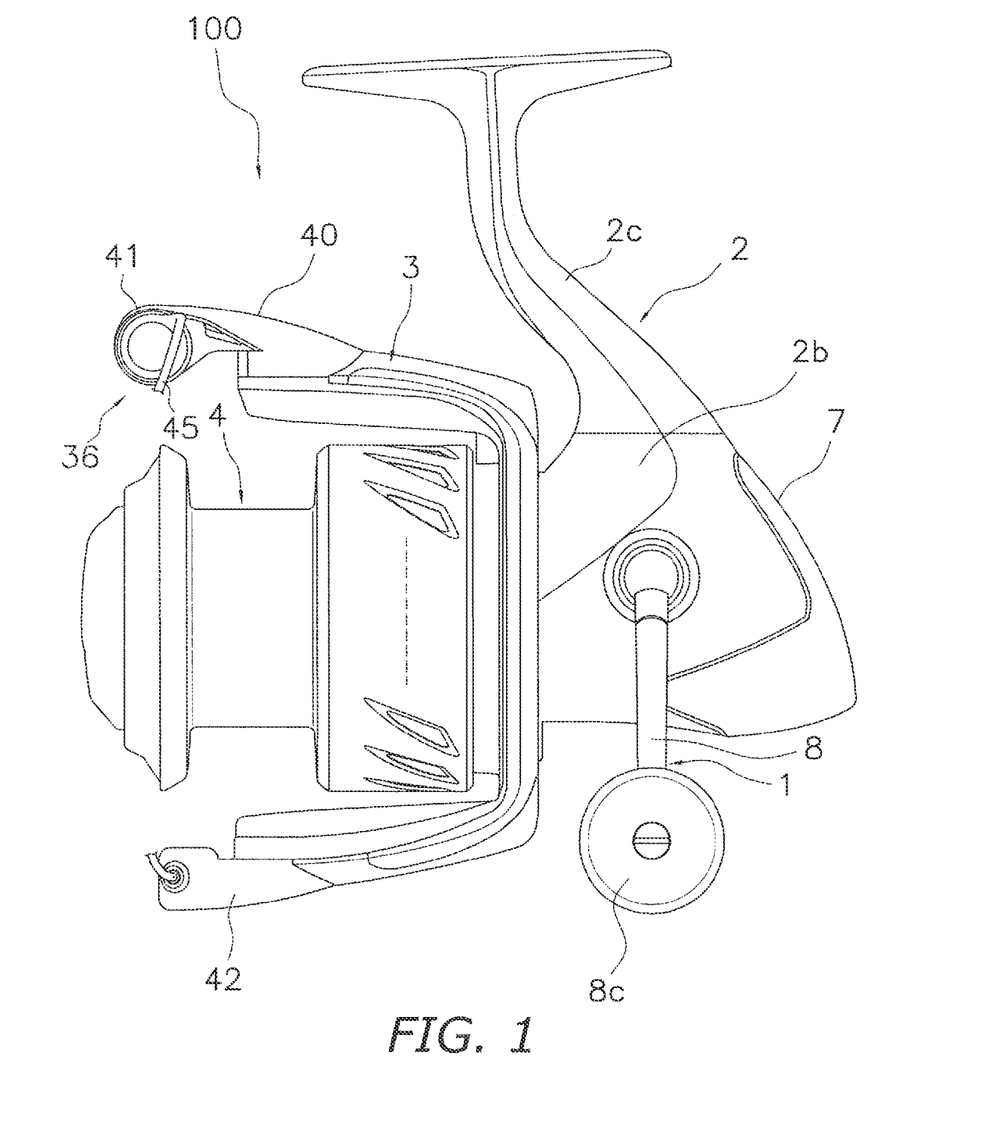
FIG. 1 is a side view of a spinning reel according to an exemplary embodiment of the present invention.
Figure 2:
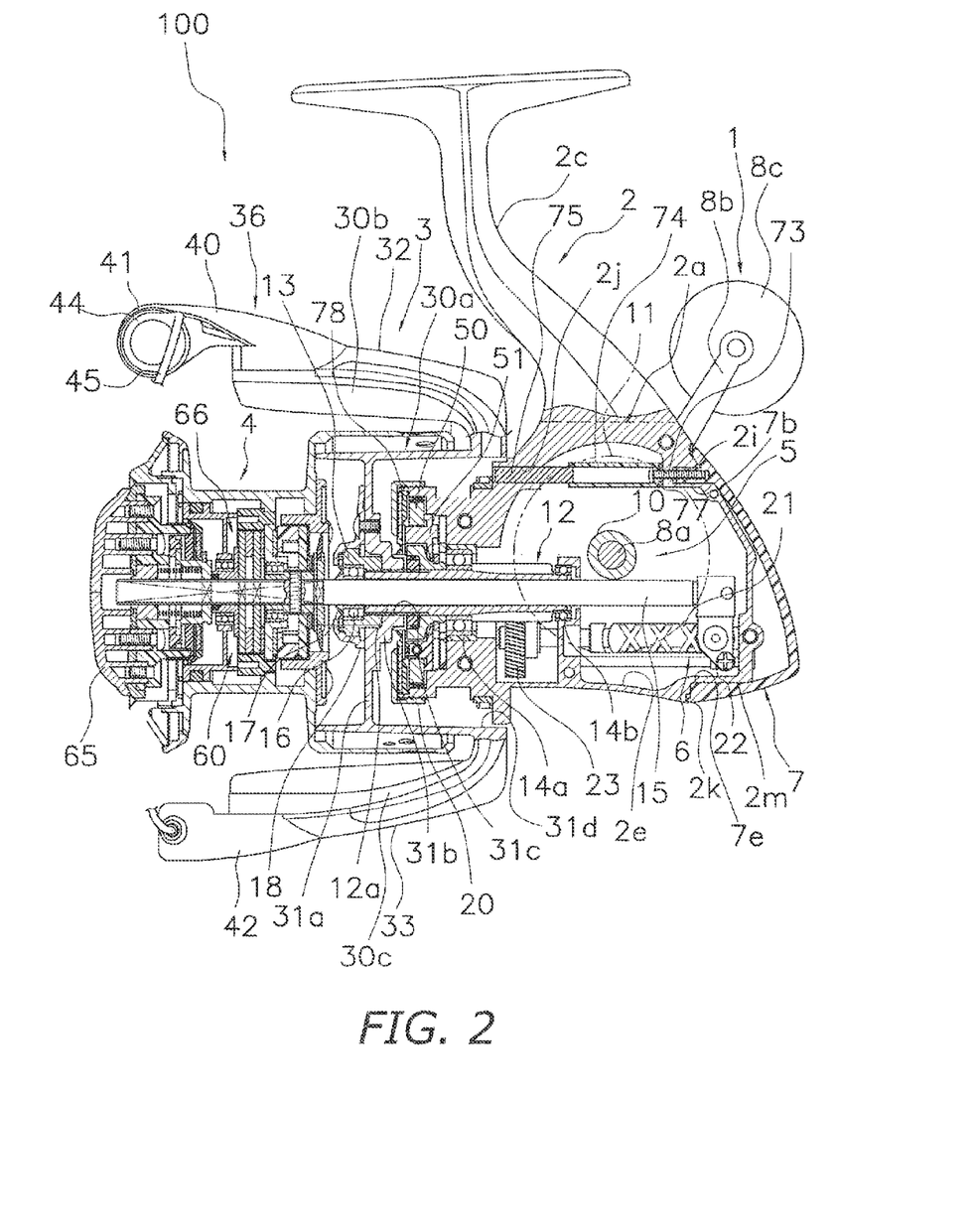
FIG. 2 is a cross-sectional side view of the spinning reel.

In FIGS. 1 and 2, a spinning reel 100 according to a first exemplary embodiment of the present invention is configured to forwardly reel out a fishing line. The spinning reel 100 includes a reel unit 2, a rotor 3 and a spool 4. The reel unit 2 supports a handle 1 in a rotatable state. The rotor 3 is configured to wind the tithing line about the spool 4. The rotor 3 is rotatably supported at the front of the reel unit 2. The spool 4 is a member that the fishing line is wound onto the outer peripheral surface thereof. The spool 4 is disposed at the front of the rotor 3, while being movable back and forth. It should be noted that the handle 1 is attachable to either the left side (see FIG. 1) or the right side of the reel unit 2.

As illustrated in FIGS. 1 and 2, the handle 1 is pivotably attached to the tip end of a handle shaft 8a (see FIG. 2), and includes a handle arm 8b, a knob shaft (not illustrated in the figures), and a handle knob 8c. The handle arm 8b is extending in a direction intersecting with the handle shaft 8a. The knob shaft is fixed to the tip end of the handle arm 8b. The handle knob 8c is rotatably attached to the knob shaft.

Structure of Reel Unit

Figure 3:
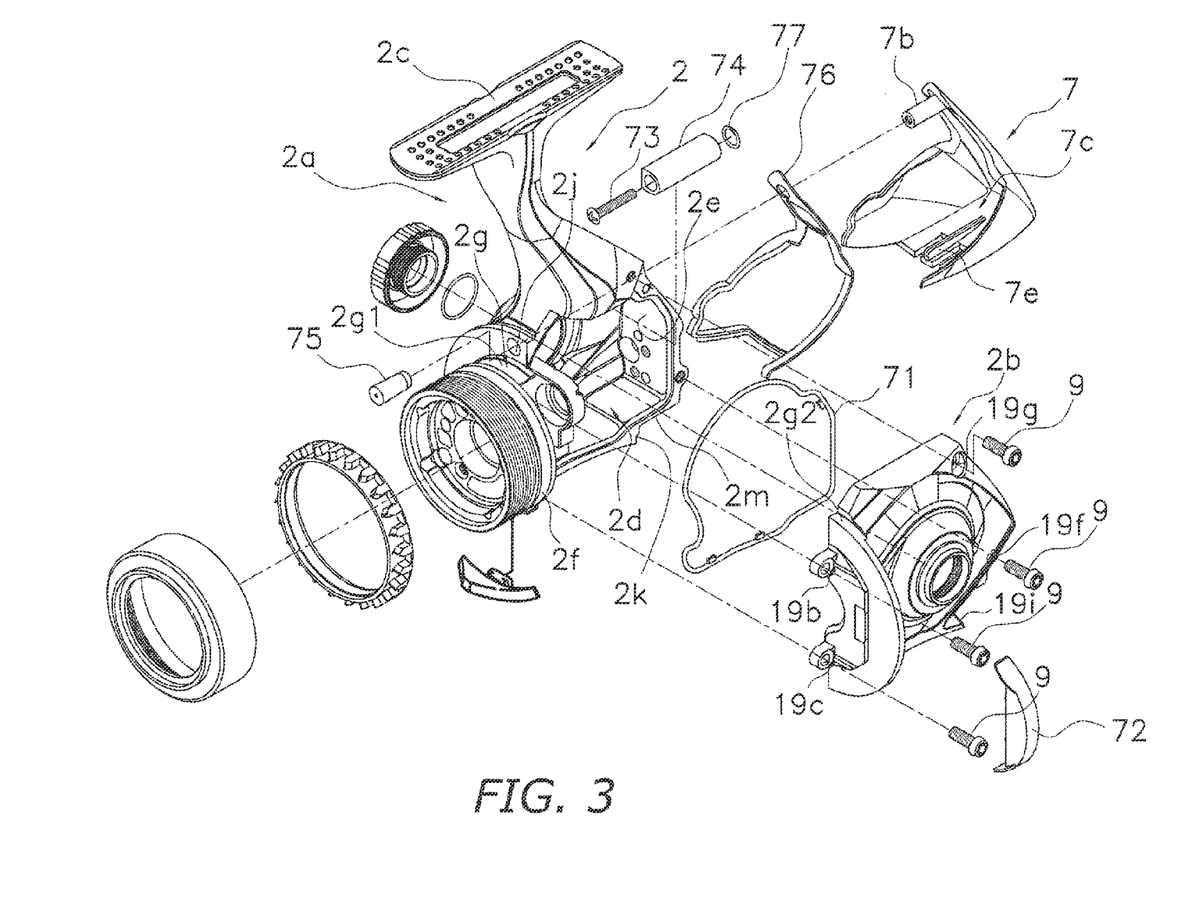
FIG. 3 is an exploded perspective view of a reel unit.

As illustrated in FIGS. 1 and 2, the reel unit 2 includes a chassis 2a, a lid member 2b, a fishing rod attachment leg 2c, a reel unit guard 7, a protruding portion 7a formed on the reel unit guard 7, and a restriction portion 19a formed on the lid member 2b. The chassis 2a is made of aluminum alloy or magnesium alloy, for instance, and contains a mechanism attachment space 2d with an opening. A rotor drive mechanism 5 and an oscillating mechanism 6 are disposed in the mechanism attachment space 2d. The rotor drive mechanism 5 is configured to rotate the rotor 3 in conjunction with the rotation of the handle 1. The oscillating mechanism 6 is configured to reciprocate the spool 4 back and forth in conjunction with the rotation of the handle 1. As illustrated in FIG. 3, a tubular portion 2f and a first flange 2g1 are formed in the front part of the chassis 2a. The first flange 2g1 forms a circular flange portion 2g together with the lid member 2b. The tubular portion 2f accommodates the anti-reverse mechanism 50 to be described in the interior thereof.

The lid member 2b is made of, for instance, aluminum alloy or magnesium. The lid member 2b is provided for closing the mechanism attachment space 2d by covering the aforementioned opening 2e of the mechanism attachment space 2d. As illustrated in FIG. 3, an endless seal plate 71 is attached between the lid member 2b and the chassis 2a, while being disposed along the opening 2e. Thus, a clearance is sealed between the chassis 2a and the lid member 2b. A second flange 2g2, which forms the circular flange portion 2g together with the first flange 2g1, is formed on the front part of the lid member 2b. Two screw insertion holes 19b and 19c are formed in positions forward of the second flange 2g2, while being disposed at a predetermined interval in the up-and-down direction. Two of a plurality of screw members 9 are inserted through the screw insertion holes 19b and 19c, respectively, and are further screwed into portions of a chassis 2a that are disposed forwards of the mechanism attachment space 2d. The front-side two of the screw members 9 are covered with a cover member 72.

Figure 4:
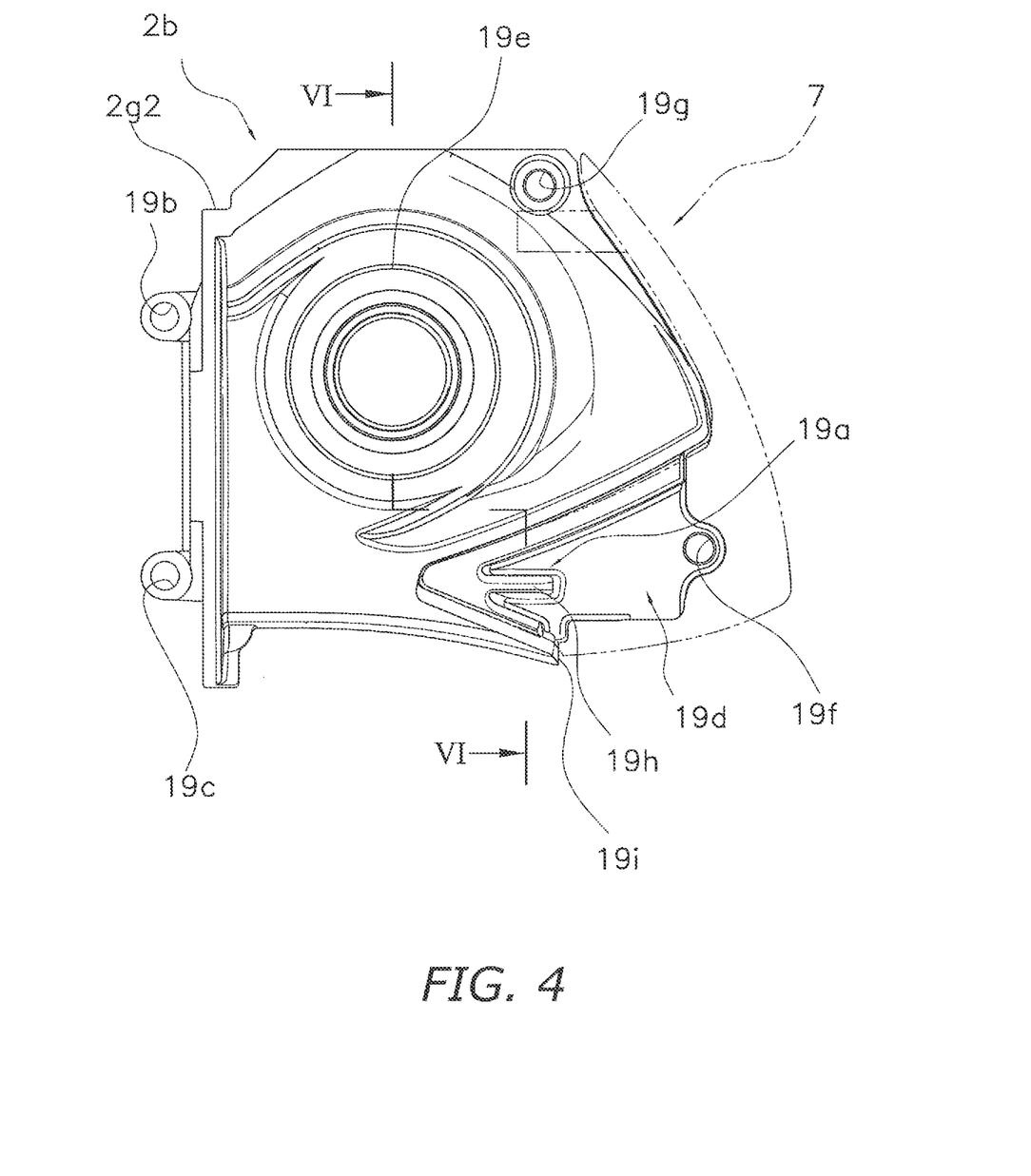
FIG. 4 is a side view of a lid member.
Figure 5:
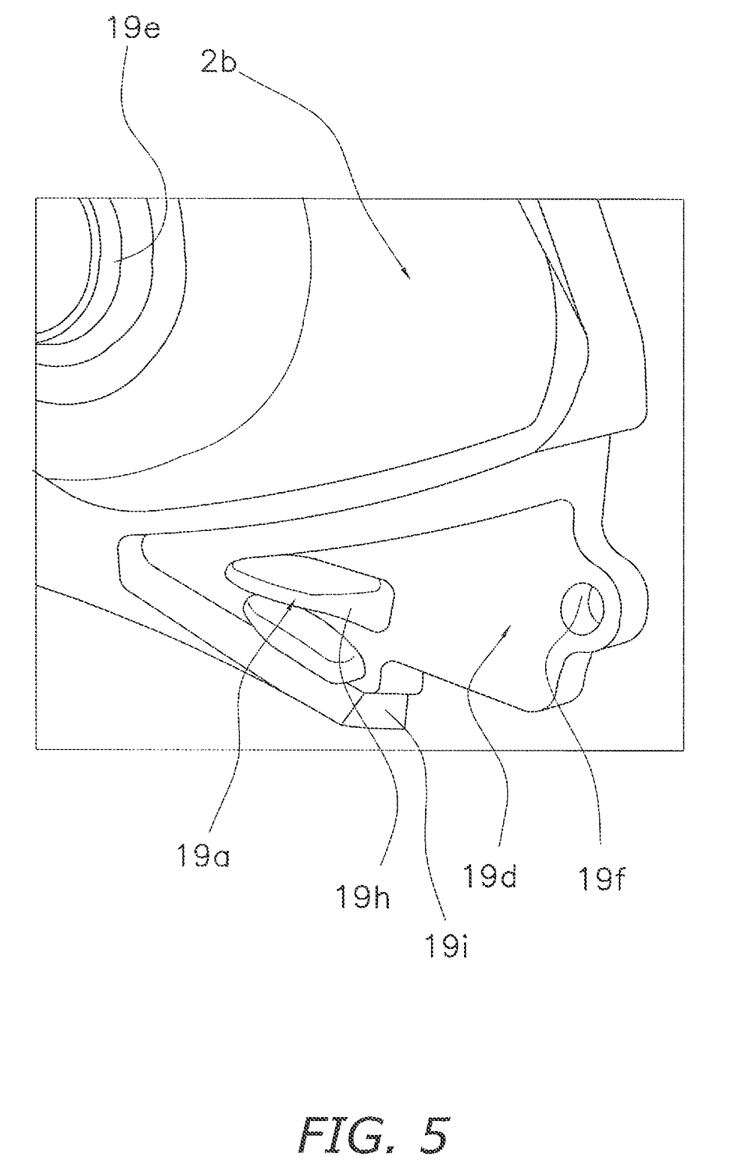
FIG. 5 is a partial perspective view of a rear part of the lid member.
Figure 6:
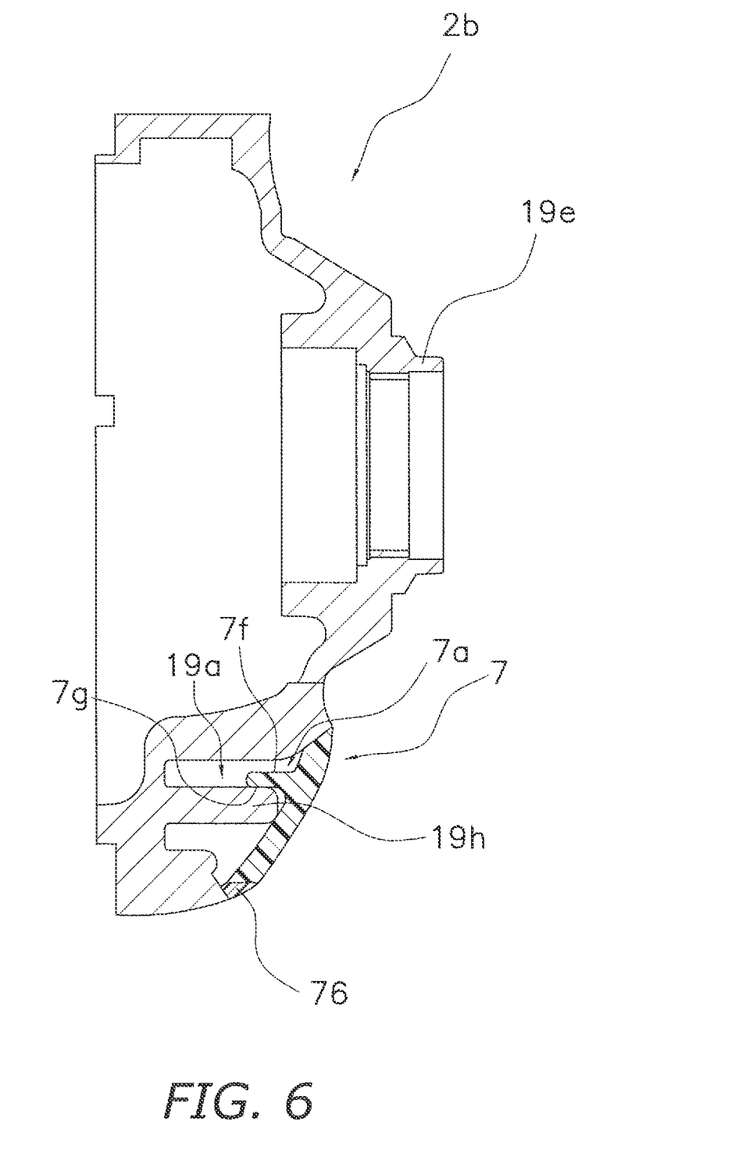
FIG. 6 is a cross-sectional view of FIG. 4 taken along a cutaway line VI-VI.

As illustrated in FIGS. 4, 5, and 6, the lid member 2b has a guard attached part 19d and a boss portion 19e. The guard attached part 19d is formed on the outer lateral surface of the rear lower part (away from the fishing rod attachment leg 2c) of the lid member 2b, while being further recessed than the other part of the lid member 2b. The boss portion 19e serves to support a drive shaft 10 to be described. The boss portion 19e is formed in a tubular shape, while being further protruding outwards than the other part of the lid member 2b. The reel unit guard 7 is attached to the guard attached part 19d such that the outer lateral surface of the reel unit guard 7 and that of the lid member 2b can be substantially continued without steps. The restriction portion 19a is disposed on the guard attached part 19d. The guard attached part 19d has a screw insertion hole 19f formed in the rear part thereof, whereas the lid member 2b has a screw insertion hole 19g formed in the upper part thereof. The screw insertion holes 19f and 19g allow the screw members 9 to be inserted therethrough. The other two of the screw members 9 are screwed into the rear part of the chassis 2a, while penetrating through the screw insertion holes 19f and 19g. Thus, the lid member 2b is fixed to the chassis 2a by the four screw members 9. It should be noted that a plurality of positioning means (not illustrated in the figures) are disposed between the chassis 2a and the lid member 2b. The plural positioning means serve to position the chassis 2a and the lid member 2b by convexo-concave fitting. Thus, the lid member 2b is appropriately positioned with respect to the chassis 2a. Therefore, the chassis 2a and the lid member 2b are not easily displaced from each other.

The restriction portion 19a is engaged with the reel unit guard 7 for preventing the reel unit guard 7 from being displaced from the lid member 2b to the downward away from the fishing rod attachment leg 2c. In the present exemplary embodiment, the restriction portion 19a has a projection 19h firmed in a plate shape. The projection 19h is protruding from the guard attached part 19d of the lid member 2b, while being extending in the back-and-firth direction. Specifically, the projection 19h is formed in a plate shape and protruding from the outer lateral surface of the guard attached part 19d to the inner lateral surface of the reel unit guard 7, while being contactable with a second surface 7g (to be described) of the protruding portion 7a.

As illustrated in FIGS. 1 and 2, the fishing rod attachment leg 2c is a roughly T-shaped portion that is extending forwards from the chassis 2a in an obliquely upward direction and is then extending in the back-and-forth direction. In the present exemplary embodiment, the fishing rod attachment leg 2c is integrally formed with the chassis 2a. However, the fishing rod attachment leg 2c can be integrally firmed with the lid member 2b.

Figure 7:
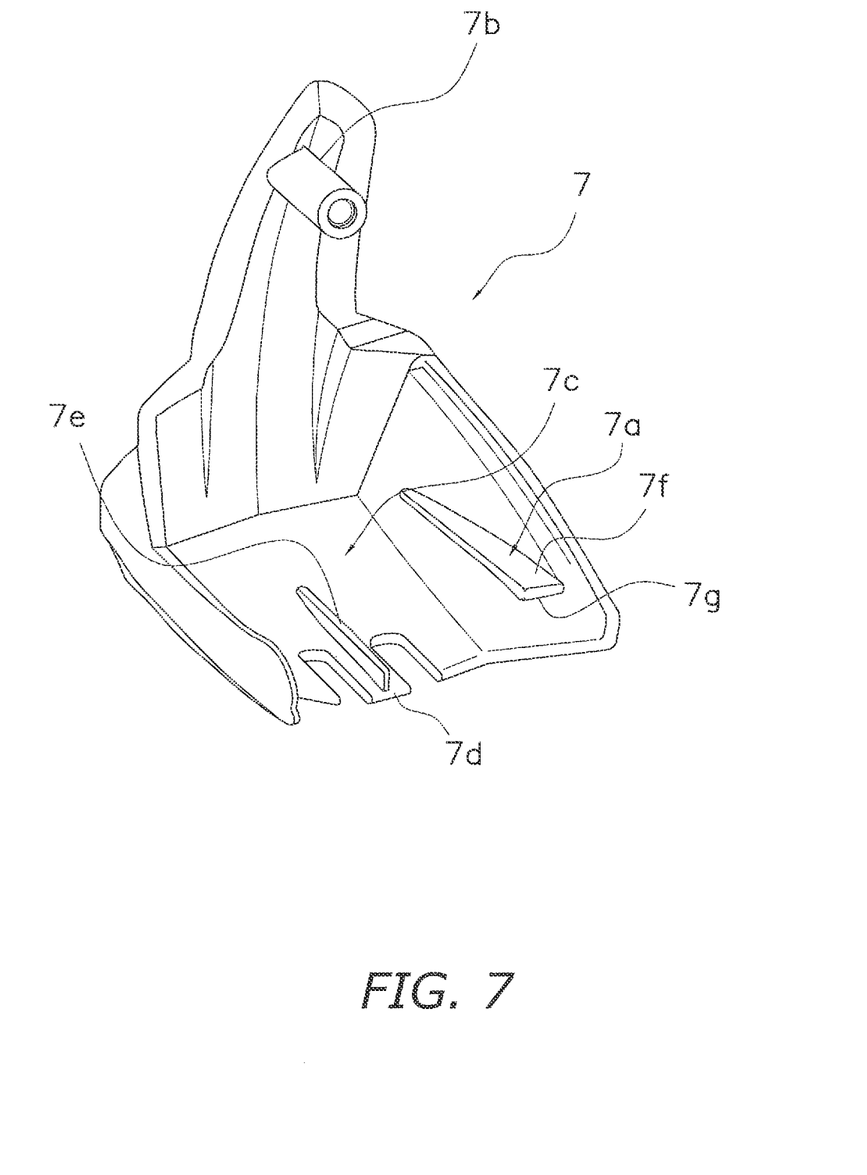
FIG. 7 is a perspective view of a reel unit guard.
Figure 8:
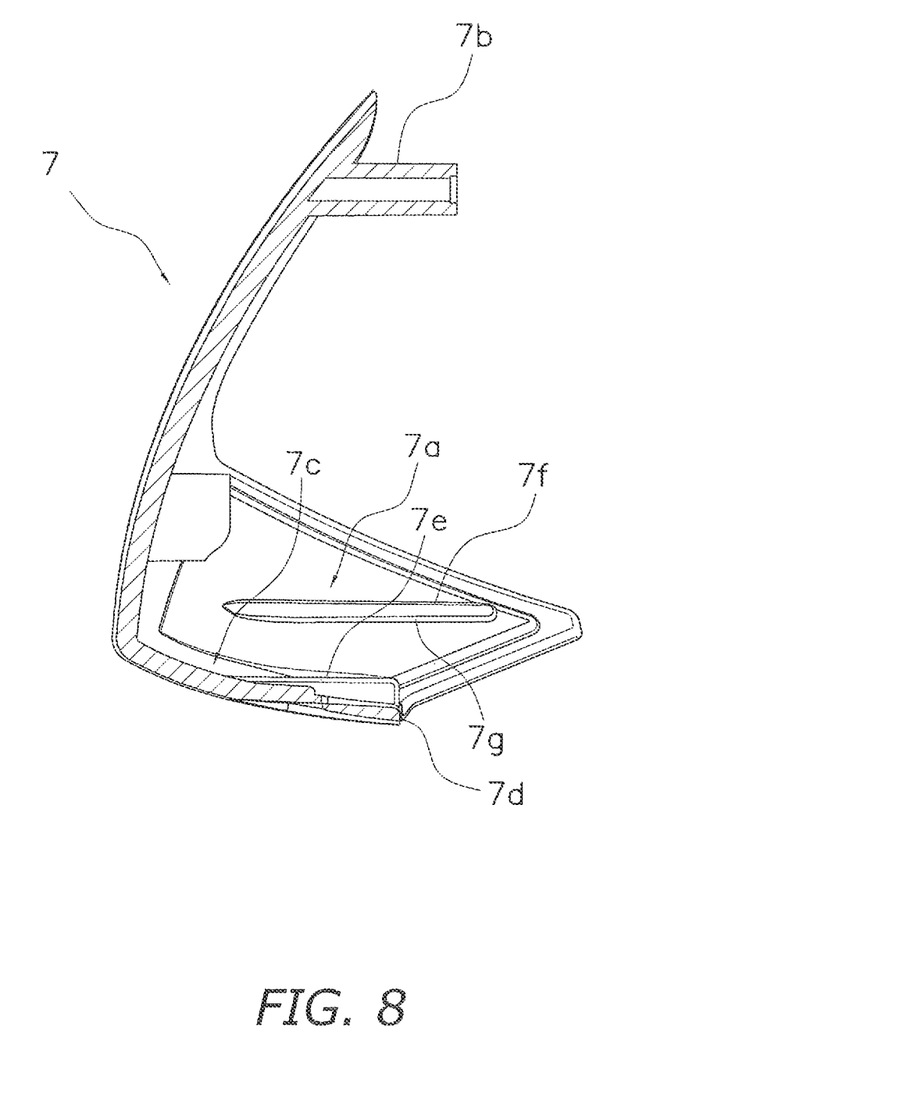
FIG. 8 is a cross-sectional side view of the reel unit guard.

As illustrated in FIGS. 3, 7, and 8, the reel unit guard 7 is made of for instance, relatively hard synthetic resin such as ABS (Acrylonitrile Butadiene Styrene) resin. The reel unit guard 7 is tapered to the rearward for covering the rear part and the rear bottom part of the chassis 2a and those of the lid member 2b. The reel unit guard 7 has a boss portion 7b and a bottom portion 7c. The boss portion 7b is disposed in a first position closer to the fishing rod attachment leg 2c. The bottom portion 7c is formed in a second position farther away from the fishing rod attachment leg 2c than the first position. The boss portion 7b is fitted into a fitting hole 2i. The fitting hole 2i is bored in the rear surface of the chassis 2a and has a small-diameter portion. The reel unit guard 7 is fixed to the chassis 2a by a screw member 73 to be screwed into the boss portion 7b. The screw member 73 is screwed into the boss portion 7b, while penetrating through an attachment member 74. The attachment member 74 is attached to the chassis 2a from the opening 2e side. The front end portion of the attachment member 74 is sealed by a seal member 75. The seal member 75 is a round rod member made of elastic material, and is attached to a through hole 2j bored in the front part of the chassis 2a. Further, an O-ring 77 (see FIGS. 2 and 3) is attached between the chassis 2a and the rear end surface of the attachment member 74. With the structure, liquid is prevented from easily entering the interior of the attachment member 74. Further, liquid is prevented from easily entering the mechanism attachment space 2d from either the through hole 2j or the fitting hole 2i.

A tip end 7d of the bottom portion 7c of the reel unit guard 7 is engaged with a step portion 2k of the chassis 2a and a step portion 19i of the lid member 2b. The reel unit guard 7 has a rib 7e formed on the inner surface of the bottom portion 7c. The rib 7e is contactable with a bottom surface 2m of the chassis 2a. The bottom portion 7c of the reel unit guard 7 is downwardly slanted to the forward. The rib 7e is formed such that its height from the slanted bottom portion 7c is gradually increased. The rib 7e prevents the reel unit guard 7 screwed only in the first position from being easily displaced upwards.

The protruding portion 7a is formed in a plate shape on the inner lateral surface of the reel unit guard 7 that is opposed to the guard attached part 19d, while being protruding towards the guard attached part 19d. The protruding portion 7a has a first surface 7f and the second surface 7g. The first surface 7f is extending in the back-and-forth direction. The second surface 7g is separated farther away from the fishing rod attachment leg 2c than the first surface 7f. As described above, the projection 19h makes contact with the second surface 7g. With the structure, the reel unit guard 7 is prevented from being easily displaced to the downward away from the fishing rod attachment leg 2c. It should be noted that the rear end of the protruding portion 7a and the front end of the restriction portion 19a are three-dimensionally rounded for easily guiding the second surface 7g of the protruding portion 7a to the restriction portion 19a in attaching the reel unit guard 7.

A body cover 76, which is made of synthetic resin, is mounted between the reel unit guard 7 and both of the chassis 2a and the lid member 2b. The body cover 76 is provided for aligning the shape of the reel unit guard 7 with the shape formed by both of the chassis 2a and the lid member 2b.

Structure of Rotor Drive Mechanism

As illustrated in FIG. 2, the rotor drive mechanism 5 includes the drive shaft 10, a drive gear 11, and a pinion gear 12. The handle shaft 8a of the handle 1 is coupled to the drive shaft 10. The drive gear 11 is configured to be rotated together with the drive shaft 10. The pinion gear 12 is meshed with the drive gear 11. The drive shaft 10 is, for instance, a tubular shaft made of stainless alloy. The both ends of the drive shaft 10 are supported by bearings (not illustrated in the figures) respectively attached to the chassis 2a and the lid member 2b. The drive shaft 10 has female threaded portions (not illustrated in the figures) formed on the both ends of the inner peripheral surface thereof.

The pinion gear 12 is, for instance, a tubular member made of stainless alloy. A front portion 12a of the pinion gear 12 is fixed to the rotor 3 by a nut 13, while penetrating through the center part of the rotor 3. Thus, the pinion gear 12 is unitarily rotatable with the rotor 3. The nut 13 is prevented from turning by a retainer 18. The retainer 18 is fixed to the rotor 3. The pinion gear 12 is rotatably supported by the chassis 2a through bearings 14a and 14b attached to the chassis 2a at a predetermined interval. Specifically, the bearing 14a supports the axially intermediate portion of the pinion gear 12, whereas the bearing 14b supports the axially rear end portion of the pinion gear 12.

Structure of Oscillating Mechanism

The oscillating mechanism 6 is configured to move a spool shaft 15 coupled to the center part of the spool 4 through a drag mechanism 60 in the back-and-forth direction. The spool 4 is thereby configured to be reciprocated in the back-and-forth direction. The oscillating mechanism 6 includes a warm shaft 21, a slider 22, and an intermediate gear 23. The warm shaft 21 is disposed below and in parallel to the spool shaft 15. The slider 22 is configured to be moved along the warm shaft 21 in the back-and-forth direction. The intermediate gear 23 is fixed to the tip end of the warm shaft 21. The warm shaft 21 is disposed in the back-and-forth direction, while being rotatably supported by the chassis 2a. The base end of the spool shaft 15 is non-rotatably coupled to the slider 22.

The rear end of the spool shaft 15 is non-rotatably fixed to the slider 22. The slider 22 is guided by two guide shafts (not illustrated in the figures) in the back-and-forth direction. The guide shafts are disposed in the chassis 2a along the back-and-forth direction. The intermediate gear 23 is meshed with the pinion gear 12.

The spool shaft 15 is disposed while penetrating through the center part of the pinion gear 12. The spool shaft 15 is configured to be reciprocated back and forth in the inside of the pinion gear 12 by the oscillating mechanism 6. The intermediate portion of the spool shaft 15 is supported by a bearing 16 attached to the inside of the nut 13, while the rear portion of the spool shaft 15 is supported by the inner peripheral surface of the rear portion of the pinion gear 12. Accordingly, the spool shaft 15 is rotatably supported while being axially movable.

Structure of Rotor

As illustrated in FIG. 2, the rotor 3 is rotatably supported by the reel unit 2 through the pinion gear 12. The rotor 3 includes a rotor body 30, a first cover member 32, a second cover member 33, and a bail arm 36. The rotor body 30 is coupled to the pinion gear 12 while being unitarily rotatable therewith.

The rotor body 30 includes a coupling part 30a, a first rotor arm 30b and a second rotor arm 30c. The coupling part 30a is a closed-end tubular part rotatably coupled to the reel unit 2 through the pinion gear 12. The first rotor arm 30b is forwardly extending from a first side (upper side in FIG. 2) of the rear end portion of the coupling part 30a, while being away from the coupling part 30a at an interval. The second rotor arm 30c is forwardly extending from a second side (lower side in FIG. 2) opposed to the first side of the rear end portion of the coupling part 30a, while being away from the coupling part 30a at an interval. The rotor body 30 is made of either aluminum alloy or magnesium alloy, for instance, and is integrally molded.

The coupling part 30a has a wall portion 31a formed in the front part thereof. The wall portion 31a has a boss 31b formed in the center part thereof. The boss 31b has a through hole 31c bored in the center part thereof. The front portion 12a of the pinion gear 12 and the spool shaft 15 penetrate through the through hole 31c. The nut 13 is disposed in front of the wall portion 31a. The rotor 3 is fixed to the pinion gear 12 by the nut 13. A seal member 17 is attached between the nut 13 and the spool shaft 15. The seal member 17 serves to prevent liquid from entering the chassis 2a through a clearance between the spool shaft 15 and the nut 13. The seal member 17 is disposed in contact with the nut 13. The coupling part 30a has a recessed portion 31d formed in the rear part thereof. The recessed portion 31d has a circular space that can accommodate the front part of the reel unit 2.

As illustrated in FIG. 2, the first rotor arm 30b is forwardly extending from the coupling part 30a, while being curved outward in a convex shape. A part of the first rotor arm 30b, which is connected to the coupling part. 30a, is curved while being extending in the circumferential direction of the coupling part 30a. On the other hand, the second rotor arm 30c is forwardly extending from the coupling part 30a, while being curved outward in a convex shape. A part of the second rotor arm 30c, which is connected to the coupling part 30a, is curved while being extending in the circumferential direction of the coupling part 30a.

The first cover member 32 covers the radially outside of the first rotor arm 30b. A bail flip mechanism (not illustrated in the figures) is mounted between the first cover member 32 and the first rotor arm 30b. The bail flip mechanism is configured to selectively urge the bail arm 36 between a fishing-line winding position and a fishing-line releasing position.

As illustrated in FIG. 2, the bail arm 36 is attached to the tip ends of the first and second rotor arms 30b and 30c, while being pivotable between the fishing-line releasing position and the fishing-line winding position. When set in the fishing-line winding position, the bail arm 36 is configured to wind the fishing line onto the spool 4 by the rotation of the rotor 3 in the fishing-line winding direction.

The bail arm 36 includes a first bail support member 40, a second bail support member 42 and a line roller 41. The first bail support member 40 is pivotably attached to the outer peripheral side of the tip end of the first rotor arm 30b. The second bait support member 42 is pivotably attached to the outer peripheral side of the tip end of the second rotor arm 30c. The line roller 41 is rotatably attached to the tip end of the first bail support member 40. Further, the bail arm 36 includes a stationary shaft (not illustrated in the figures), a stationary shaft cover 44, and a bail 45. The stationary shaft is a member for supporting the line roller 41. The stationary shaft is fixed to the tip end of the first bail support member 40, while being cantilevered by the first bail support member 40. The stationary shaft cover 44 is disposed on the tip-end side of the stationary shaft. The bail 45 couples the stationary shaft cover 44 and the second bail support member 42.

Other Structures

As illustrated in FIG. 2, the anti-reverse mechanism 50, which is configured to prevent the reverse rotation of the rotor 3, is disposed in the interior of the tubular portion 2f of the reel unit 2 as described above. The anti-reverse mechanism 50 includes a one-way clutch 51. The one-way clutch 51 is of a roller type with a free-wheeling inner race. The anti-reverse mechanism 50 is configured to constantly prevent the rotor 3 from rotating reversely (i.e., in the fishing-line release direction). Therefore, the anti-reverse mechanism 50 never allows the reverse rotation of the rotor 3. It should be noted that the anti-reverse mechanism 50 can be configured to be switchable between a reverse rotation allowed state and a reverse rotation prevented state. The anti-reverse mechanism 50 is retained by a cap member 20 fixed to the tubular portion 2f. For example, the cap member 20 is screwed onto the outer peripheral surface of the tubular portion 2f. A seal member 78 is attached between the cap member 20 and the anti-reverse mechanism 50. The seal member 78 prevents liquid from entering the tubular portion 2f. The tip end of the seal member 78 makes contact with the boss 31b of the rotor 3.

The mechanism attachment space 2d is herein kept fluid-light by the following elements: the seal plate 71 disposed between the chassis 2a and the lid member 2b of the reel unit 2; the seal member 17 disposed in front of the nut 13; the seal member 78 disposed on the anti-reverse mechanism 50; the O-ring 77 attached to the attachment member 74; and the seal member 75 fitted to the through hole 2j. Liquid can be thereby prevented from entering the mechanism attachment space 2d from the outside.

As illustrated in FIG. 2, the spool 4 is disposed between the first and second rotor arms 30b and 30c of the rotor 3. The spool 4 is rotatably supported by the tip end of the spool shaft 15. The spool 4 is configured to be moved back and forth together with the spool shaft 15, and simultaneously, the fishing line is wound onto the outer periphery of the spool 4. The spool 4 is made of for instance, aluminum alloy. The spool 4 accommodates the drag mechanism 60 in the interior thereof. The drag mechanism 60 is configured to brake the spool 4 for applying a set amount of drag force to the spool 4.

As illustrated in FIG. 2, the drag mechanism 60 is configured to brake the rotation of the spool 4 in the fishing-line releasing direction in order to apply drag force to the spool 4. The drag mechanism 60 includes a drag knob assembly 65 and a friction part 66. The drag knob assembly 65 is provided for manually regulating drag force. The friction part 66 is configured to be pressed towards the spool 4 by the drag knob assembly 65, and thereby, drag three is regulated. The drag knob assembly 65 is disposed in front of the spool 4. The friction part 66 is disposed in the interior of the spool 4.

Procedure of Attaching Reel Unit Guard

In the spinning reel 100 with the aforementioned structure, the rotor drive mechanism 5 and the oscillating mechanism 6 are attached to the mechanism attachment space 2d, and then, the lid member 2b and the reel unit guard 7 are fixed to the chassis 2a, in fixing these components, the attachment member 74, which is used for fixing the reel unit guard 7, is temporarily assembled to the mechanism attachment space 2d before attaching of the drive shaft 10 onto which the drive gear 11 is mounted. In temporally assembling the attachment member 74, the screw member 73 is attached to the attachment member 74, and is then inserted into the small-diameter portion of the fitting hole 2i while being kept attached to the attachment member 74.

Under the condition, the drive shaft 10 is embedded into the reel unit 2. Further, the seal plate 71 is disposed on the edge portion of the mechanism attachment space 2d, and the lid member 2b is fixed to the chassis 2a by the four screw members 9. When fixing of the lid member 2b is finished, the reel unit guard 7 is fixed to the chassis 2a. At this time, the body cover 76 is disposed on the rear surface of the chassis 2a and that of the lid member 2b. Under the condition, the boss portion 7b of the reel unit guard 7 is inserted into the fitting hole 2i, while the edge portion of the reel unit guard 7 makes contact with the body cover 76.

When the boss portion 7b is inserted into the fitting hole 2i, the second surface 7g of the protruding portion 7a disposed on the reel unit guard 7 makes contact with the upper surface of the projection 19h of the restriction portion 19a. The reel unit guard 7 is thereby prevented from being easily displaced downwards. When inserting of the boss portion 7b is finished, the tip end of a screwdriver is inserted through the through hole 2j in order to turn the screw member 73 for fixing the boss portion 7b. Then, the screw member 73 is tightly screwed into the boss portion 7b, while the tip end of the screwdriver is engaged with, for instance, a cross-shaped groove formed on the head of the screw member 73. Accordingly, the tip end 7d of the bottom portion 7c of the reel unit guard 7 is engaged with the step portion 2k of the chassis 2a and the step portion 19i of the lid member 2b. The reel unit guard 7 is thereby fixed to the chassis 2a. When fixing of the reel unit guard 7 is finished, the seal member 75 is attached to the through hole 2j in order to close the through hole 2j. Thus, attaching of the reel unit guard 7 is finished. The reel unit guard 7 is herein restricted from moving in the downward direction away from the fishing rod attachment leg 2c with the structure that the restriction portion 19a is disposed on the lid member 2b and is engaged with the protruding portion 7a disposed on the reel unit guard 7. Accordingly, the reel unit guard 7 can be prevented from being easily displaced in the upward-downward direction from the lid member 2b.

Second Exemplary Embodiment

In the following description of another exemplary embodiment, explanation will be made for components structured differently from the corresponding ones of the first exemplary embodiment while three-digit reference numbers are assigned to the components. The three-digit reference numbers, which are assigned to the components of the following exemplary embodiment, are produced by changing reference numerals assigned to the corresponding components of the first exemplary embodiment. Further, explanation will not be made for such components that are similar to those of the first exemplary embodiment.

In the first exemplary embodiment, the protruding portion 7a and the restriction portion 19a are both formed in plate shapes. However, unlike the first exemplary embodiment, a projection 119h of a restriction portion 119a is formed in a round rod shape and is protruding from the outer lateral surface of a guard attached part 119d in a second exemplary embodiment illustrated in FIG. 9. It should be noted that similarly to the first exemplary embodiment, the protruding portion 7a is formed in a plate shape and is protruding from the inner lateral surface of the reel unit guard 7.

Figure 9:
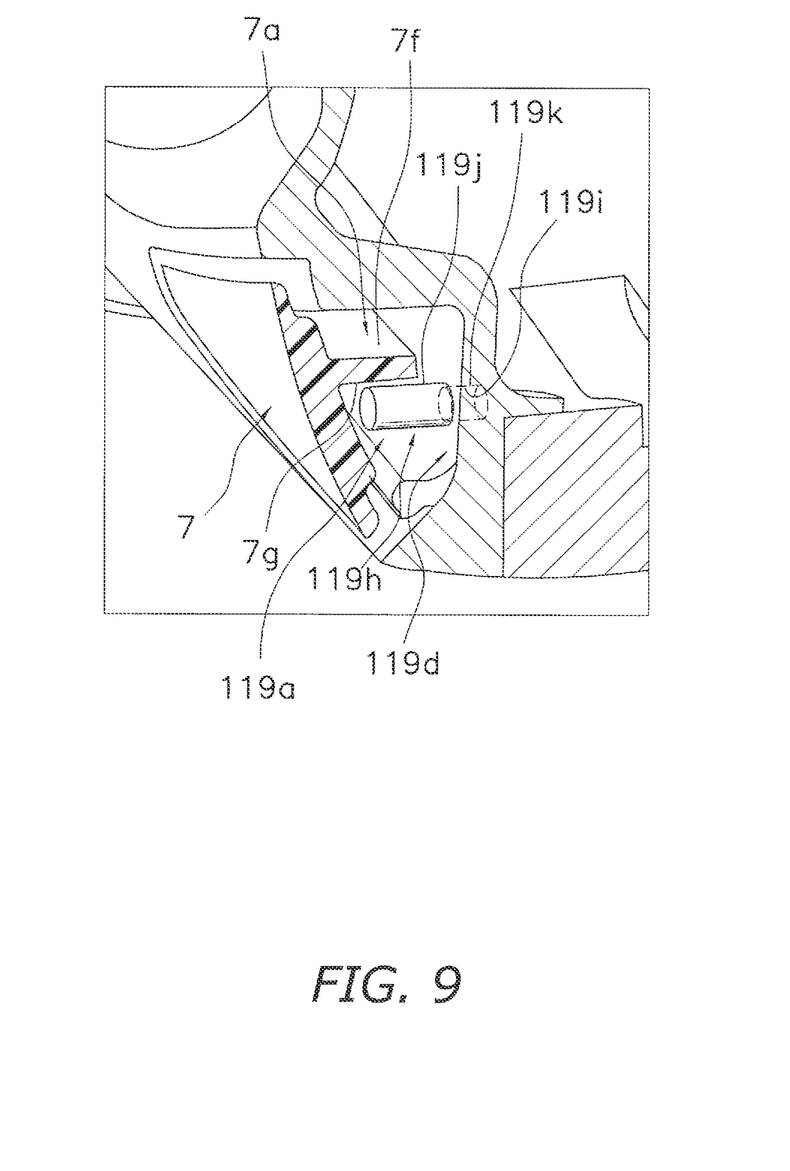
FIG. 9 is a partial perspective view of a rear part of a lid member according to another exemplary embodiment.

The projection 119h is fitted into an attachment hole 119i bored in the guard attached part 119d. The attachment hole 119i can or can not be a through hole. The attachment hole 119i is, for instance, a threaded hole. The projection 119h has a projection main body 119j and an attachment portion 119k. The projection main body 119j is contactable with the second surface 7g of the protruding portion 7a. The attachment portion 119k is screwed into the attachment hole 119i. Therefore, the restriction portion 119a is detachably attached to the lid member 2b in the second exemplary embodiment.

It should be noted that in FIG. 9, the projection main body 119j has a diameter greater than that of the attachment portion 119k. However, the projection main body 119j and the attachment portion 119k can have different diameters or the same diameter.

The projection 119h with the aforementioned structure is advantageous in that the outline alignment and the clearance adjustment of the reel unit guard 7 can be easily performed with respect to the chassis 2a and the lid member 2b by preparing a plurality of types of the projections 119h having the projection main bodies 119j with different diameters in mass production.

It should be noted that the projection 119h is herein screwed into the attachment hole 119i, but can be designed to be just fitted into the attachment hole. For example, when the projection is designed to be retained by the inner lateral surface of the reel unit guard 7, the attachment portion of the projection can be clearance-fitted to the attachment hole.

Other Exemplary Embodiment

An exemplary embodiment of the present invention has been described above. However, the present invention is not limited to the aforementioned exemplary embodiment, and a variety of changes can be made without departing from the scope of the present invention. Especially, a plurality of exemplary embodiments and modifications described in the present specification can be arbitrarily combined on an as-needed basis.

(a) In the first and second exemplary embodiments, the reel unit guard 7 is fixed to only the chassis 2a without being fixed to the lid member 2b. Therefore, the reel unit guard 7 is easily displaced with respect to the lid member 2b rather than with respect to the chassis 2a. To cope with this, the lid member 2b is provided with the restriction portion 19a, while the reel unit guard 7 is provided with the protruding portion 7a. However, the present invention is not limited to the structure. For example, when the reel unit guard is fixed to the lid member, the restriction portion can be protruding from the chassis towards the reel unit guard, while the protruding portion can be protruding from the reel unit guard towards the chassis. Further, regardless of the object to which the reel unit guard is fixed, at least one of the chassis and the lid member can be provided with the restriction portion, while the reel unit guard can be provided with the protruding portion to be restricted by the restriction portion.

(b) In the second exemplary embodiment, the projection 119h of the restriction portion 119a is protruding in a round rod shape, whereas the protruding portion 7a is protruding in a plate shape. However, the present invention is not limited to the structure. The protruding portion and the restriction portion can be engaged in any suitable state as long as the reel unit guard can be prevented from being displaced in a downward direction away from the fishing rod attachment leg of the reel unit guard. For example, the projection can be protruding in a plate shape, whereas the protruding portion can be protruding in a rod shape (e.g., a round rod shape).

(c) In the aforementioned exemplary embodiments, the fishing rod attachment leg 2c is integrally formed with the chassis 2a. However, the fishing rod attachment leg 2c can be integrally formed with the lid member 2b. In this case, where the reel unit guard is fixed to the lid member, the chassis can be provided with the restriction portion as explained in the aforementioned other exemplary embodiment (a).

Features

The aforementioned exemplary embodiments can be expressed as follows.

(A) The spinning reel 100 allows a fishing rod to be attached thereto and is configured to forwardly reel out the fishing line. The spinning reel 100 includes the handle 1, the spool 4, the rotor 3, the oscillating mechanism 6, the rotor drive mechanism 5, and the reel unit 2. The spool 4 allows the fishing line to be wound thereabout. The rotor 3 is configured to wind the fishing line about the spool 4. The oscillating mechanism 6 is configured to move the spool 4 back and forth by the rotation of the handle 1. The rotor drive mechanism 5 is configured to rotate the rotor 3 by the rotation of the handle 1. The reel unit 2 includes the fishing rod attachment leg 2c, the chassis 2a, the lid member 2b, the reel unit guard 7, the protruding portion 7a, and the restriction portion 19a. The reel unit 2 is provided with the fishing rod attachment leg 2c on either the chassis 2a or the lid member 2b. The fishing rod attachment leg 2c allows the fishing rod to be attached thereto. The chassis 2a has the mechanism attachment space 2d with an opening. The mechanism attachment space 2d accommodates the oscillating mechanism 6 and the rotor drive mechanism 5. The lid member 2b covers the mechanism attachment space 2d of the chassis 2a. The reel unit guard 7 is formed in a tapered shape and covers rear of the chassis 2a and the lid member 2b. The protruding portion 7a is protruding towards the lid member 2b from the inner lateral surface of the reel unit guard 7, i.e., the inner lateral surface disposed on a side away from the fishing rod attachment leg 2c. The restriction portion 19a is disposed on the lid member 2b and is engaged with the protruding portion 7a to restrict the reel unit guard 7 from moving in the direction away from the fishing rod attachment leg 2c.

In the spinning reel 100, the rotor drive mechanism 5 and the oscillating mechanism 6 are attached to the mechanism attachment space 2d of the chassis 2a. The lid member 2b is then attached to the chassis 2a. Subsequently, the reel unit guard 7 is attached for covering the rear surface of the chassis 2a and that of the lid member 2b. When the reel unit guard 7 is attached to the chassis 2a and the lid member 2b, the restriction portion 19a disposed on the lid member 2b is engaged with the protruding portion 7a disposed on the reel unit guard 7. Accordingly, the reel unit guard 7 is restricted from moving in the downward direction away from the fishing rod attachment leg 2c. Thus, the reel unit guard 7 is herein restricted from moving in the downward direction away from the fishing rod attachment leg 2c with the structure that the restriction portion 19a is disposed on the lid member 2b and is engaged with the protruding portion 7a disposed on the reel unit guard 7. Accordingly, the reel unit guard 7 can be prevented from being easily displaced in the upward-downward direction from the lid member 2b.

(B) In the spinning reel 100, the reel unit guard 7 is fixed to the chassis 2a in the first position by the screw member 73, while being engaged with the chassis 2a in the second position disposed farther away from the fishing rod attachment leg 2c than the first position. Further, the restriction portion 19a is disposed on the lid member 2b. In this case, the reel unit guard 7 is prevented from being easily displaced in the downward direction with respect to the lid member 2b even without being fixed to the lid member 2b.

(C) In the spinning reel 100, the protruding portion 7a has the first surface 7f and the second surface 7g disposed farther away from the fishing rod attachment leg 2c than the first surface 7f. The protruding portion 7a is protruding in a plate shape towards the lid member 2b. In this case, the area of the contact surface of the protruding portion 7a is increased due to the structure of the protruding portion 7a protruding in a plate shape towards the lid member 2b. Therefore, the restriction portion 19a can be easily engaged with the protruding portion 7a.

(D) In the spinning reel 100, the restriction portion 19a has the projection 19h. The projection 19h is protruding from the outer lateral surface of the lid member 2b towards the reel unit guard 7 such that the projection 19h is contactable with the second surface 7g of the protruding portion 7a. In this case, the reel unit guard 7 is prevented from moving in the downward direction away from the fishing rod attachment leg 2c due to the structure that the projection 19h makes contact with the second surface 7g of the protruding portion 7a.

(E) In the spinning reel 100, the projection 19h is protruding in a plate shape towards the reel unit guard 7. In this case, the contact area between the protruding portion 7a and the projection 19h is further increased due to both of the structures of the protruding portion 7a and the projection 19h formed in plate shapes. Therefore, the reel unit guard 7 is further prevented from being easily displaced in the downward direction.

(F) In the spinning reel of another exemplary embodiment, the projection 119h is protruding in a rod shape towards the reel unit guard 7. In this case, due to the structure of the projection 119h funned in a rod shape, the clearance of the reel unit guard 7 can be minutely adjusted by changing the size of the horizontal cross-section of the rod-shaped projection 119h.

(G) In the spinning reel of another exemplary embodiment, the projection 119h is formed in a round rod shape and is detachably attached to the lid member 2b. In this case, the outline alignment and the clearance adjustment can be easily done for the reel unit guard 7 by preparing a plurality of types of the projections 119h that the outer diameters thereof are different from each other in mass production.

(H) In the spinning reel 100, the reel unit guard 7 has the rib 7e contactable with the bottom surface 2m of the chassis 2a. In this case, the reel unit guard 7, which is fixed to the chassis 2a in the first position closer to the fishing rod attachment leg 2c, is contactable at the rib 7e with the bottom surface 2m of the chassis 2a. Therefore, the reel unit guard 7 is prevented from being easily displaced in the upward direction with respect to the chassis 2a in the direction closer to the fishing rod attachment leg 2c.

Advantageous Effects of Invention

According to the present invention, the reel unit guard can be restricted from moving in the downward direction away from the fishing rod attachment leg with the structure. The restriction portion is disposed on at least one of the chassis and the lid member, and is engaged with the protruding portion disposed on the reel unit guard. Accordingly, the reel unit guard can be prevented from being easily displaced in the upward-downward direction from at least one of the chassis and the lid member.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spinning reel allowing a fishing rod to be attached thereto, the spinning reel being configured to forwardly reel out a fishing line, the spinning reel comprising:
    a handle;
    a spool;
    a rotor being configured to wind the fishing line about the spool;
    an oscillating mechanism being configured to move the spool back and forth by rotation of the handle;
    a rotor drive mechanism being configured to rotate rotor by the rotation of the handle; and
    a reel unit including
        a fishing rod attachment leg allowing the fishing rod to be attached thereto,
        a chassis having a mechanism attachment space to accommodate the oscillating mechanism and the rotor drive mechanism,
        a lid member covering the mechanism attachment space,
        a reel unit guard having a tapered shape, the reel unit guard covering a rear side of the chassis and a rear side of the lid member,
        a protruding portion protruding towards at least one of the chassis and the lid member from an inner lateral surface of the reel unit guard, the inner lateral surface being disposed on a side away from the fishing rod attachment leg, and
        a projection being disposed on at least one of the chassis and the lid member, the projection being engaged with the protruding portion to restrict the reel unit guard from moving in a direction away from the fishing rod attachment leg, and
    the reel unit being provided with the fishing rod attachment leg disposed on either the chassis or the lid member.

2. The spinning reel according to claim 1, wherein
    the reel unit guard is fixed to the chassis in a first position close to the fishing rod attachment leg by a screw member,
    the reel unit guard is engaged with the chassis in a second position being farther away from the fishing rod attachment leg than from the first position, and
    the projection is disposed on the lid member.

3. The spinning reel according to claim 2, wherein
    the protruding portion has a first surface and a second surface disposed farther away from the fishing rod attachment leg than the first surface front the fishing rod attachment, and
    the protruding portion protrudes in a plate shape towards the lid member.

4. A spinning reel allowing a fishing rod to be attached thereto, the spinning reel being configured to forwardly reel out a fishing line, the spinning reel comprising:

a handle;

a spool;

a rotor being configured to wind the fishing line about the spool;

an oscillating mechanism being configured to move the spool back and forth by rotation of the handle;

a rotor drive mechanism being configured to rotate the rotor by the rotation of the handle; and a reel unit including a fishing rod attachment leg allowing the fishing rod to be attached thereto, a chassis having a mechanism attachment space to accommodate the oscillating mechanism and the rotor drive mechanism, a lid member covering the mechanism attachment space, a reel unit guard having a tapered shape, the reel unit guard covering a rear side of the chassis and a rear side of the lid member, a protruding portion protruding towards at least one of the chassis and the lid member from an inner lateral surface of the reel unit guard, the inner lateral surface being disposed on a side away from the fishing rod attachment leg, and a restricting portion being disposed on at least one of the chassis and the lid member, the restricting portion being engaged with the protruding portion to restrict the reel unit guard from moving in a direction away from the fishing rod attachment leg, and the reel unit being provided with the fishing rod attachment leg disposed on either the chassis or the lid member, the reel unit guard being fixed to the chassis in a first position close to the fishing rod attachment leg by a screw member, and being engaged with the chassis in a second position farther away from the fishing rod attachment leg than from the first position, the protrusion being disposed on the lid member, and having a first surface and a second surface disposed farther away from the fishing rod attachment leg than the first surface from the fishing rod attachment, and the protruding portion protruding in a plate shape towards the lid member, the restriction portion having a projection, protruding from an outer lateral surface of the lid member towards the reel unit guard, and being arranged to be contactable with the second surface of the protruding portion.

5. The spinning reel according to claim 4, wherein the projection protrudes in a plate shape towards the reel unit guard.

6. The spinning reel according to claim 4, wherein the projection protrudes in a rod shape towards the reel unit guard.

7. The spinning reel according to claim 6, wherein the projection has a round rod shape, and the projection is detachably attached to the lid member.

8. The spinning reel according to claim 2, wherein the reel unit guard has a rib contactable with a bottom surface of the chassis.

\* \* \* \* \*